US009407381B2

(12) United States Patent
Kyosti et al.

(10) Patent No.: US 9,407,381 B2
(45) Date of Patent: Aug. 2, 2016

(54) RADIO CHANNEL EMULATION

(71) Applicant: Keysight Technologies Singapore (Holdings) Pte. Ltd., Minneapolis, MN (US)

(72) Inventors: Pekka Kyosti, Jokirinne (FI); Petteri Heino, Oulu (FI)

(73) Assignee: Keysight Technologies Singapore (Holdings) Pte. Ltd., Singapore (SG)

( * ) Notice: Subject to any disclaimer, the term of this patent is extended or adjusted under 35 U.S.C. 154(b) by 0 days.

(21) Appl. No.: 13/810,386

(22) PCT Filed: Sep. 27, 2012

(86) PCT No.: PCT/FI2012/050932
§ 371 (c)(1),
(2) Date: Jan. 15, 2013

(87) PCT Pub. No.: WO2014/049194
PCT Pub. Date: Apr. 3, 2014

(65) Prior Publication Data
US 2015/0215053 A1 Jul. 30, 2015

(51) Int. Cl.
*H04B 17/00* (2015.01)
*H04W 24/06* (2009.01)
*H04B 7/06* (2006.01)
*H04B 17/391* (2015.01)
*H04B 7/04* (2006.01)
*H04B 7/08* (2006.01)

(52) U.S. Cl.
CPC .............. *H04B 17/0087* (2013.01); *H04B 7/04* (2013.01); *H04B 7/0615* (2013.01); *H04B 7/086* (2013.01); *H04B 17/3912* (2015.01); *H04W 24/06* (2013.01); *H04B 7/0617* (2013.01)

(58) Field of Classification Search
CPC .................................................. H04B 17/0087
USPC ......................... 455/63.1, 67.11, 67.12, 67.16
See application file for complete search history.

(56) References Cited

U.S. PATENT DOCUMENTS 6,236,363 B1 * 5/2001 Robbins ................. H01Q 3/267
  342/169
7,890,821 B2 * 2/2011 Music ................... G06F 11/261
  370/242

(Continued)

FOREIGN PATENT DOCUMENTS

EP    1 578 032 A1    9/2005
JP    2007067951      3/2007

(Continued)

OTHER PUBLICATIONS

V. Mottonen, International Search Report for corresponding International Application No. PCT/FI2012/050952; Jun. 12, 2013; pp. 1-6.

(Continued)

*Primary Examiner* — Tuan H Nguyen

(57) ABSTRACT

Apparatus comprises a radio channel emulator of a radio system and a combiner. The combiner receives antenna data defining a characteristic radiation pattern of each predetermined antenna element of a predetermined antenna array; forms modified antenna data associated with a predetermined number of modified antenna elements by weighting the antenna data with a predetermined coefficient data; forms modified radio channel data by combining a predetermined radio channel data and the modified antenna data; and feed the modified radio channel data to the radio channel emulator; and the emulator receives at least one signal each of which being associated with a modified antenna element and perform emulation with the at least one signal and the modified radio channel data.

11 Claims, 3 Drawing Sheets

(56) References Cited

U.S. PATENT DOCUMENTS

| | | |
|---|---|---|
| 2005/0267715 A1 | 12/2005 | Kolu et al. |
| 2009/0094492 A1 | 4/2009 | Music et al. |
| 2010/0177836 A1 | 7/2010 | Ylitalo |
| 2012/0225624 A1 | 9/2012 | Kyosti et al. |
| 2013/0027256 A1 | 1/2013 | Guo et al. |

FOREIGN PATENT DOCUMENTS

| | | |
|---|---|---|
| WO | 2006/136645 A1 | 12/2006 |
| WO | 2008/132268 A1 | 11/2008 |
| WO | 2010/094000 A2 | 8/2010 |
| WO | 2011094989 | 8/2011 |

OTHER PUBLICATIONS

Written Opinion dated Jun. 12, 2013, regarding PCT/FI2012/050932.

International Preliminary Report on Patentability mailed Mar. 31, 2015 for International Application No. PCT/FI2012/050932.

International Search Report mailed on Jun. 12, 2013 for International Application No. PCT/FI2012/050932.

Extended European Search Report dated Feb. 19, 2016 in Application No. EP12885651.5.

* cited by examiner

RADIO CHANNEL EMULATION

CROSS-REFERENCE TO RELATED APPLICATION

This application is a National Stage application of International Application No. PCT/FI2012/050932, filed Sep. 27, 2012, which is incorporated by reference herein in its entirety.

BACKGROUND

1. Field

The invention relates to radio channel emulation.

2. Description of the Related Art

Communication between a DUT (Device Under Test) and a base station of a radio system can be tested using a wired connection. When a radio frequency signal is transmitted from a transmitter to a receiver, the signal propagates in a radio channel along one or more paths having different signal phases and amplitudes, which causes fadings of different duration and strength in the signal. In addition, noise and interference caused by other transmitters interfere with the radio connection.

Antennas used in base stations of real radio systems are often arrays having a plurality of antenna elements. When an antenna has N antenna elements where N is an integer larger than 1, they may be arranged in a desired two or three dimensional form of i×j or i×j×k antenna elements where i, j and k are positive integers. The base station may use all or a selected number P of antenna elements, where P is an integer equal to or smaller than N. A signal to the antenna is split to the desired number P of antenna elements and the antenna element signals are then phase shifted and power controlled in order to form a desired beam with the antenna.

A transmitter and a receiver can be tested either in real circumstances or by using a radio channel simulator simulating real circumstances. Since tests performed in real circumstances are typically cumbersome, subject to uncontrollable phenomena and depend on the test environment, a device simulating a radio channel is used to simulate a radio channel of the desired kind. In a digital radio channel simulator, a channel is usually modeled with a FIR filter (Finite Impulse Response filter), which generates convolution between the channel model and an applied signal by weighting the signal, delayed by different delays, with channel coefficients, i.e. tap coefficients, and by summing the weighted signal components. The channel coefficients are modified to correspond to the behaviour of a real channel.

In order to perform radio channel emulation with the antenna array, each signal from the base station to the antenna is split into P antenna element signals each directed to one antenna element and the antenna element signals are phase shifted and power controlled by phase shifters and attenuators. Every signal is then separately connected to the radio channel emulator. Since the number M of desired antenna elements may be high, for example tens or hundreds, the radio channel emulator must have a lot of input ports for the signals from the antenna elements and it must be able to emulate each antenna signal input to its port.

However, the emulation is cumbersome with a splitter, a large number of phase shifting and power control elements. During different radio channel emulations the number of antenna elements, the phase shifts and the weights may also differ. Moreover, the requirement of a large number of the input ports and emulation channels may be challenging or even impossible for the emulator. Hence, there is a need for a better solution to perform radio channel emulation with an antenna array of plurality of antenna elements.

SUMMARY

The following presents a simplified summary of the invention in order to provide a basic understanding of some aspects of the invention. Its purpose is to present some concepts of the invention in a simplified form as a prelude to the more detailed description that is presented later.

An aspect of the invention relates to apparatus of claim 1.

An aspect of the invention relates to method of claim 9.

An aspect of the invention relates to an apparatus of claim 10.

Although the various aspects, embodiments and features of the invention are recited independently, it should be appreciated that all combinations of the various aspects, embodiments and features of the invention are possible and within the scope of the present invention as claimed.

The present solution provides advantages. The solution simplifies the physical couplings and reduces the number of electrical components.

BRIEF DESCRIPTION OF THE DRAWINGS

In the following the invention will be described in greater detail by means of exemplary embodiments with reference to the attached drawings, in which.

DETAILED DESCRIPTION

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein. Although the specification may refer to "an", "one", or "some" embodiment(s), this does not necessarily mean that the feature only applies to a single embodiment. Single features of different embodiments may also be combined to provide other embodiments. Text in brackets includes some details of expressions.

The following embodiments may be applied to radio frequency signals in various radio systems. The applications include, for example, WiMAX (Worldwide Interoperability for Microwave Access), Wi-Fi, HSPA (High-Speed Packet Access), 3GPP (Third Generation Partnership Project) LTE (Long Term Evolution). It may also be applied with different physical layer multiple access techniques such as CDMA (Code Division Multiple Access), WCDMA (Wide-band CDMA), FDMA (Frequency Division Multiple Access), TDMA (Time Division Multiple Access), OFDMA (Orthogonal Frequency Division Multiple Access) and MIMO (Multiple In Multiple Out). It also applies to TDD (Time Division Duplex) and FDD (Frequency Division Duplex).

In the, which is also a possible application, signals are distributed to antenna elements in a different manner with respect to the present embodiments.

Figure 1:
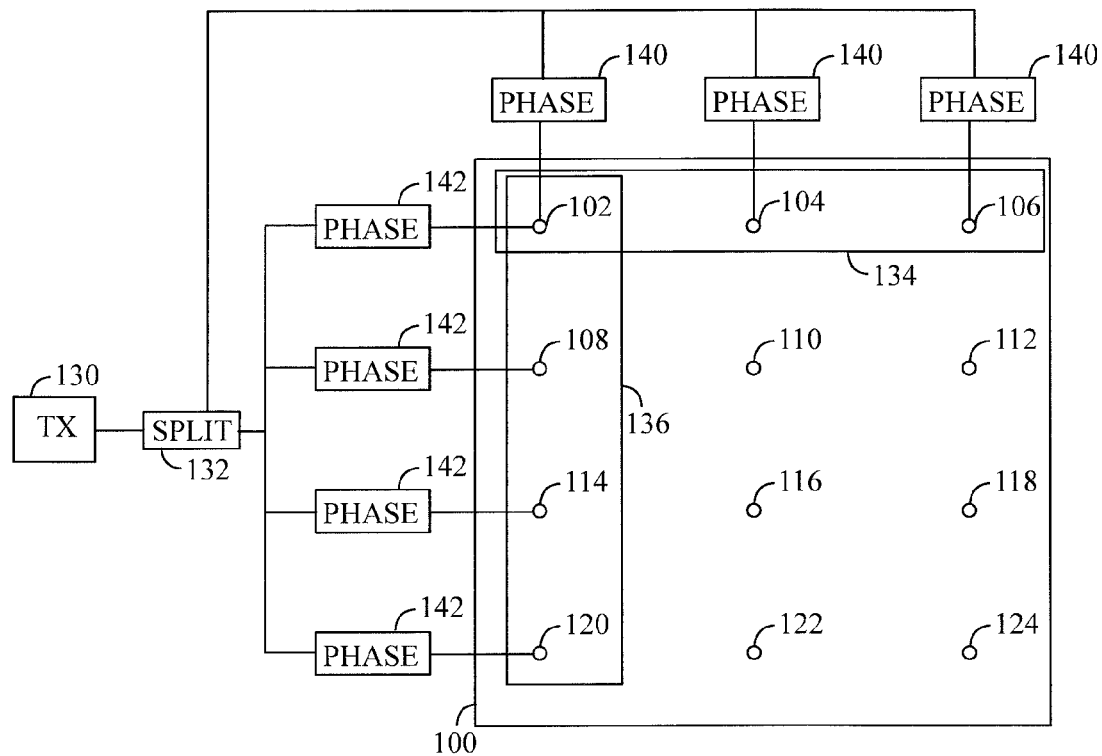
FIG. 1 shows an example of antenna array.

FIG. 1 presents an example of an antenna array 100 of a real base station which is used in a radio system. In this example, the antenna array 100 has twelve antenna elements 102, 104, 106, 108, 110, 112, 114, 116, 118, 120, 122, 124. The antenna array 100 is a standard antenna array which the manufacturer has made for a multipurpose use such that different kinds of beamforming and a selection of a various number of antenna elements are possible, for instance. Hence, if a purpose is that the base station has only by two specified antenna elements 134,136, two combinations of antenna elements are made. The specified antenna elements may be made by a combination of the antenna elements 102 to 124, the combinations including P antenna elements, where P≤N. The signal from the transmitter 130 of the base station may then be split into two in a splitter 132 and each of the two signals may be phase shifted relative to each other by phase shifters 140, 142. The phase shifters 140, 142 may also adjust the relative power of the two signals with respect to each other. The antenna elements 102 to 124 then output at least one beam of a predetermined shape which is characteristic to the specified antenna elements 134, 136 on the basis of the relative phase shifting and power control.

Thus, the antenna elements 102 to 106 with their phase shifters 140, 142 correspond to one 134 of the two specified antenna elements, and the antenna elements 102, 108, 114 and 120 correspond to another 136 of the two specified antenna elements. Additionally or alternatively, a corresponding antenna element selection with phase shifters and a signal combiner may also be applied to reception.

The phase shifters 140, 142 may be analog phase shifting circuits such as a Butler matrix, microstrips, stripline circuit or the like.

Alternatively, one or more baseband signal may be split and complex weights which cause phase and/or power changes similar to those caused by the phase shifters 140, 142 may be applied to the split baseband signals. The baseband signals may then be mixed in a mixer (not shown in FIG. 1) to form radio frequency signals which may then be fed to the antenna elements 102 to 108, 114 and 120.

The weights may be complex numbers such that the real value may control the relative power of the signal communicated by an antenna element and the imaginary value may control the relative phase shift of the signal communicated by an antenna element for the beamforming.

In principle, complex weights may be applied to radio frequency signals instead of phase shifters 140, 142.

In reality, if the antenna array 100 has N antenna elements 102 to 124, where N is an integer larger than 1, P antenna elements (such as antenna elements 102 to 108, 114 and 120) may be used in communication, where P is an integer equal to or smaller than N. The P antenna elements then form N specified antenna elements 134, 136.

Figure 2:
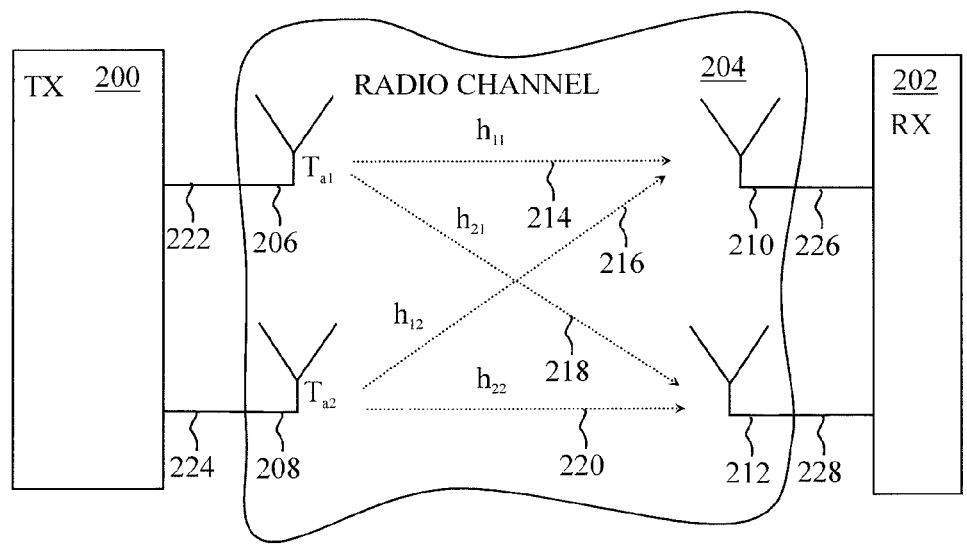
FIG. 2 shows an example of a radio channel between a transmitter and a receiver.

FIG. 2 shows a transmitter 200 such a base station of a radio system connected to transmit antennas 206, 208, a receiver 202 connected to receive antennas 210, 212, the radio propagation paths 214, 216, 218, 220 and input ports 222, 224 and output ports 226, 228. Although the example of FIG. 2 shows two antennas per device, in general the number of antennas may be one or more. FIG. 2 may be understood to illustrate communication in a real radio system or emulation of radio channels of a radio system.

The transmitter 200 inputs transmit signals to input ports 222 and 224 of the transmit antennas 206 and 208. The transmit antennas 206, 208 transmit antenna signals Ta1, Ta2 to the radio channel 204. The receiver antennas 210, 212 receive a portion of the electromagnetic wave transmitted by the transmit antennas 206, 208 and output receive signals through output ports 226 and 228.

FIG. 2 further shows propagation channels 214, 216, 218, and 220 in terms of complex radio channel coefficients h11, h12, h21 and h22, respectively, the radio channel coefficients being usually matrices.

Each radio channel coefficient characterizes a propagation channel between a transmit antenna and a receive antenna pair. The radio channel coefficients may also be called channel taps and/or an impulse response, and they define the amplitude and the phase characteristics of the corresponding signal paths. In a wideband channel, radio channel taps may also characterize the frequency response of the propagation channel.

One real antenna 206, 208 may be realized by one or more antenna elements. For example, the antenna 206 may have antenna elements 102 to 106 and the antenna element 208 may have antenna elements 102, 108, 114, and 120 shown in FIG. 1. Furthermore, the radio channel 204 and the antennas 206, 208 may be emulated such that real antennas 206, 208 are replaced by virtual antennas comprising one or more virtual antenna elements similar to the specified antenna elements 134, 136 including a splitter 132 and relative power control and phasing components such as phase shifters 140, 142 related to them. The term virtual means here that the components are not real, but they have been implemented using a computer program and/or digital data.

Figure 3:
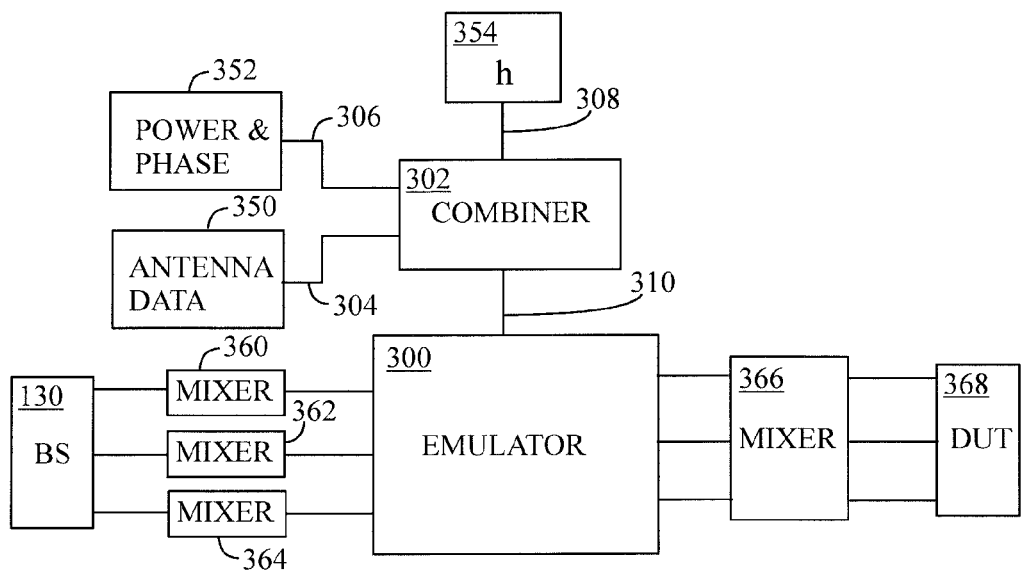
FIG. 3 shows an example of an emulation configuration.

FIG. 3 illustrates an emulation arrangement which comprises a radio channel emulator 300 of a radio system and a combiner 302. The combiner 302 may be a separate element or an element of the emulator 300. The combiner 302 receives antenna data (F) 304 about a real antenna array similar to antenna array 100 presented in FIG. 1. The antenna data (F) 304 defines a characteristic radiation pattern separately for each of the antenna elements used in the emulation. The real antenna array and its antenna elements are known and hence their data is predetermined. The antenna data (F) 304 may be based on theory or it may be measured from a real antenna array.

The combiner 302 forms modified antenna data by weighting the antenna data 304 with predetermined coefficient data (C) 306 associated with relative phasings of the antenna elements of the predetermined antenna array. The number of modified antenna elements M defined by the modified antenna data is the same as or less than the number of the antenna elements N of the predetermined antenna array. In this way, the modified antenna elements represent virtually accomplished antenna elements which include both the data of a standard antenna array and weighted couplings between the antenna elements. The modified antenna elements correspond to or can be called as the virtual antenna elements.

The combiner 302 forms modified radio channel data 310 by combining a predetermined radio channel data (h) 308 and the modified antenna data. After this combination, each radio channel tap emulates the combined effect resulting from both the original radio channel associated with the standard antenna array and the modified antenna array properties.

The combiner 302 feeds the modified radio channel data 310 to the radio channel emulation in the emulator 300. The emulator 300 also receives at least one signal the number of which is the same as the number of modified antenna elements defined by the modified antenna data and which is also included in radio channel data 310. Thus, each of the at least one signal is associated with a predetermined modified antenna element. The emulator 300 then performs emulation with the at least one signal and the modified radio channel data.

In an embodiment, the emulation arrangement may comprise an antenna data memory 350 which stores the antenna data (F) 304 about the characteristic radiation pattern of each element of a real antenna array of a real base station of the radio system. The antenna data memory 350 may provide the combiner 302 with the antenna data (F) 304.

In an embodiment, the antenna data (F) 304 may additionally comprise geometrical data of the antenna array used in the emulation differing from the predetermined antenna array 100. The combiner 302 may form the modified antenna data 310 on the basis of the geometrical data. The antenna to be used in the emulation may have a different shape than the predetermined antenna array 100. The modified antenna elements 134, 136 may have different distances from each other than the predetermined antenna elements 102 to 124. The differences in distances, for example, may have effect on the interference of the electromagnetic radiation from the modified antenna elements and that is why the differences may be taken into account also in emulation.

In an embodiment, the emulation arrangement may comprise a coefficient data memory 352 which stores the predetermined coefficient data (C) 306 about couplings of the predetermined antenna elements. The complex weights of the coefficient data (C) cause phase and/or power changes similar to those caused by the phase shifters 140, 142. Thus, the predetermined coefficient data defines a relative power and a relative phase shift associated with each predetermined antenna element (such as antenna elements 102 to 108, 114, 120 in FIG. 1) for providing a desired radiation pattern for the at least one modified antenna element (such as antenna elements 134, 136 in FIG. 1).

In an embodiment, the radio channel data h may be stored in a radio channel data memory 354.

In an embodiment, the number P of the predetermined antenna elements (which are virtual forms of the antenna elements 102 to 108, 114, 120 in FIG. 1, for example) that are actually used in emulation is smaller than a total number of the antenna elements 102 to 124 of the predetermined antenna array 100. The coefficient data (F) may be used to limit the number of the predetermined antenna elements smaller than the total number of the antenna elements of the predetermined antenna array.

When the transmitter 130 transmits M signals towards the emulator 300 the radio frequency signals are down converted to baseband signals in the down mixers 360, 362, 364. Then the baseband signals are used in the emulation performed by the emulator 300. The emulator 300 then outputs at maximum M processed baseband signals which are then up converted to corresponding one or more radio frequency signals in an up mixer 366. The up converted radio frequency signal is then fed to a device-under-test 368.

Figure 4:
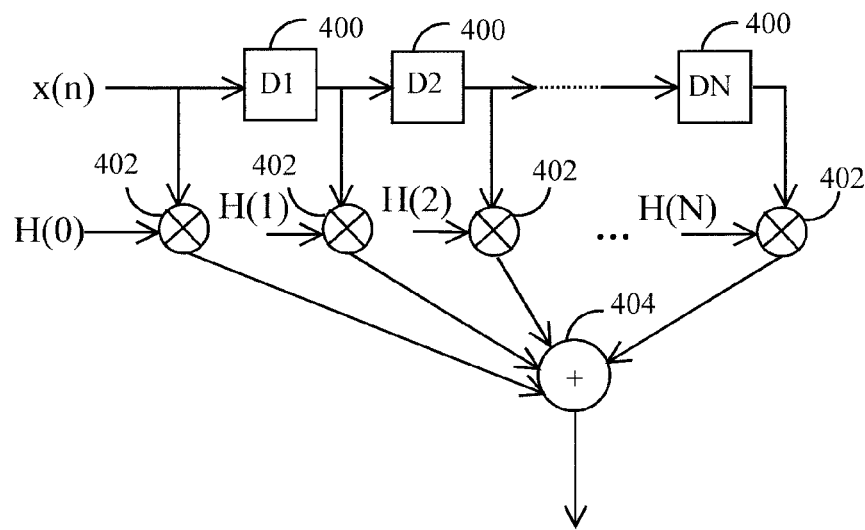
FIG. 4 shows a block diagram of a FIR filter.

In the emulator 300, a radio channel can be simulated for instance by means of a digital finite impulse response (FIR) filter, whose block diagram is shown in FIG. 4. The FIR filter comprises delay elements 400 arranged as a shift register, weight coefficient blocks 402 and a summer 404. An input signal x(n) is delayed in each delay element 400, whose delays may have the same or different length in time, and the delayed signals are weighted in the weight coefficient blocks 402 by the desired weight coefficient h(i), where i=[0, ... N]. The weight coefficients H=[H(0), ..., H(N)] are channel estimates of the radio channel modified by the radiation patterns of the antenna elements, also called tap coefficients of the FIR filter. The weight coefficients are changed in the same way as the characteristics of a real radio channel are thought to change. The weight coefficients may also be changed according the modified antenna elements that need to be emulated. The delayed and weighted signals are summed in a summer 404.

Generally, weight coefficients may be real or complex. Complex weight coefficients are needed since radio systems use quadrature modulation, wherein a signal is divided into two parts. The real signal part I (Inphase) is multiplied by a carrier without phase shift and the imaginary signal part Q (Quadrature) is multiplied by a phase shifted carrier. Thus signal x can be expressed in the form x=I+jQ, where I is the real signal part, Q is the imaginary signal part and j is an imaginary unit.

In mathematical form, the output signal y(n) of the FIR filter can be expressed as convolution as the sum of the product of the delayed signal and the weight coefficients of the modified radio channel data H:

$$y(n)=x*H=\Sum_{i=1}^{J} H(i)\times(n-i) \qquad (1)$$

where * denotes a convolution operation, J denotes elements in the radio channel data element H(i) and n denotes the index of a signal element. Signals x and y and modified radio channel data H can be processed as scalar, in a vector form or in a matrix form in a manner known per se. Since the weight coefficients also include the data of the antenna patterns of the modified antenna elements, the emulation can be performed for signals communicated by the modified antenna elements.

Analyze now theoretically the forming of virtual antenna elements on the basis of summing and weighting of data of real antenna elements. Real antenna elements of the real antenna array may be called original elements (i.e. antenna elements 102 to 124 in FIG. 1). The new antenna elements formed by weighting the original antenna elements with complex weight factors may be called virtual elements which correspond to the antenna elements 134, 136 in FIG. 1.

There are N original antenna elements. Radiation pattern of an original antenna element n, n=1, ..., N, is $$F_n(\Omega) = \begin{bmatrix} F_n^\varphi(\Omega) \\ F_n^\theta(\Omega) \end{bmatrix}, \qquad (2)$$

where $\Omega$ denotes space angle, $F^\varphi$ and $F^\theta$ denote complex antenna gains of $\varphi$ and $\theta$ polarization components, respectively. P sub-sets of N elements are selected, weighted and summed up to compose the modified antenna data about new M virtual antenna elements i.e. modified antenna elements. The modified antenna data of the M virtual antenna elements may be fed through M input ports/signals to the emulator 300. It always holds that M≤P≤N.

The selection and weighting of the radiation patterns of predetermined antenna elements of a predefined antenna array is defined by a M×N complex weighting matrix C $$C = \begin{bmatrix} c_{1,1} & \cdots & c_{1,N} \\ \vdots & \ddots & \vdots \\ c_{M,1} & \cdots & c_{M,N} \end{bmatrix}. \qquad (3)$$

Value $c_{m,n}=0$ denotes that the $n^{th}$ antenna element doesn't belong to the $m^{th}$ virtual element, i.e. to the $m^{th}$ sub-set of original antenna elements.

Finally, the M modified antenna data of new virtual elements may be formed as $$V_m(\Omega)=\Sum_{n=1}^{N} c_{m,n} F_n(\Omega), \qquad (4)$$

where m=1, ..., M. The modified antenna data $V_m(\Omega)$ also refers to radiation patterns of P antenna elements which in combinations determined by the weighting matrix C form the radiation patterns of the virtual antenna elements. The P antenna elements may be selected by giving a non-zero value for radiation patterns of P antenna elements and the value 0 for (N-P) antenna elements where P is a non-negative whole number (0, 1, 2, . . . ).

The description above assumes, that the original radiation patterns $F_n(\Omega)$ are specified to a common phase center. Anyhow, in practice they may be measured with respect to independent (per element) phase centers such that a radiation pattern is of an antenna element is specified with respect to the antenna element. The difference in phase centers is not a problem in generation of virtual elements whenever the exact positions of the original N antenna elements are known which is the very usual case.

The modified radio channel data H may then be formed by a convolution of the modified antenna data $V_m(\Omega)$ and the radio channel data h:

$$H_m(t,\tau)=\int h(t,\tau,\Omega)V_m(\Omega)d\Omega, \quad (5)$$

where $H_m$ denotes a channel from antenna m, m is a (n virtual) antenna element (since receiving antenna's radiation pattern is not included in equation (5) it may be assumed isotropic), t is time, τ is a moment of time and Ω is an angle-of-departure (AoD) at the transmitter side. The receiving antenna data of the DUT 368 may also be included in the modified radio channel data H by a convolution of the modified antenna data $V_m(\Omega)$, radiation pattern data of the receiving antenna $F_{rx}$ and the radio channel data h:

$$H_{m,rx}(t,\tau)=\iint F_{rx}(\omega)h(t,\tau,\omega)V_m(\Omega)d\Omega d\omega \quad (6)$$

where ω refers to angle-of-arrival (AoA) at the receiver side.

Figure 5:
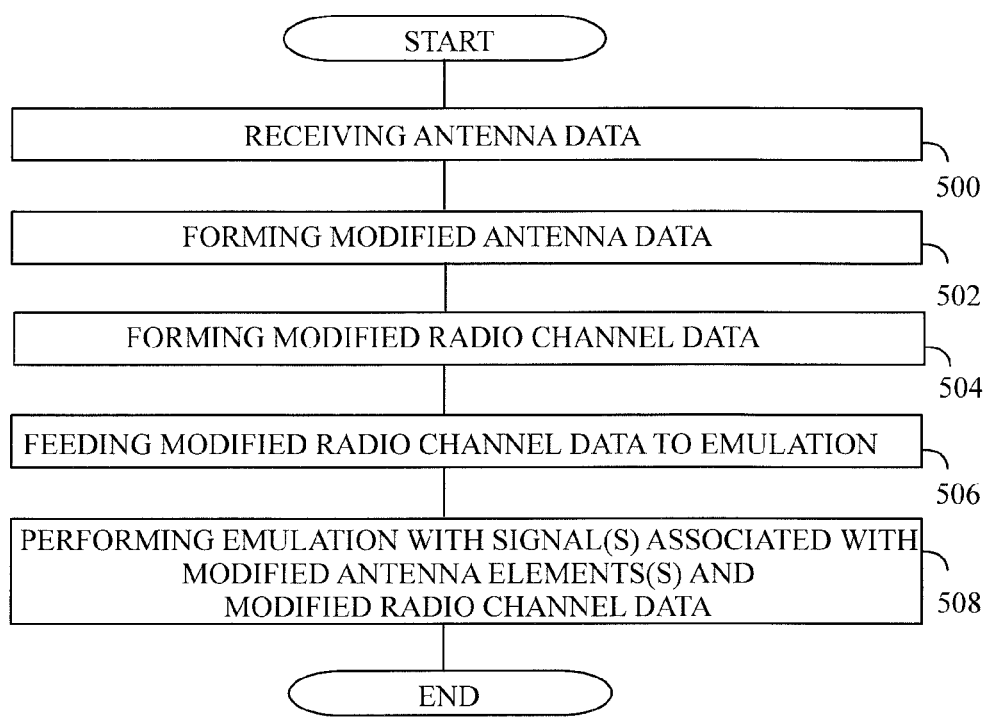
FIG. 5 shows a flow chart of the method.

FIG. 5 presents a flow chart of the method. In step 500, antenna data (F) defining a characteristic radiation pattern of each predetermined antenna element of a predetermined antenna array is received by a combiner. In step 502, modified antenna data (V) associated with a predetermined number of modified antenna elements is formed by weighting the antenna data (F) with a predetermined coefficient data (C). In step 504, modified radio channel data is formed by combining a predetermined radio channel data and the modified antenna data. In step 506, the modified radio channel data is fed from the combiner to the radio channel emulator. In step 508, at least one signal each of which being associated with a modified antenna element is received in the emulator and emulation is performed with the at least one signal and the modified radio channel data.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The combiner 302 and the emulator 300 capable of performing the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The combiner 302 and the emulator 300 comprise circuitries which refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

As a further example, the term 'circuitry' would also cover an implementation of merely a processor (or multiple processors) or a portion of a processor and its (or their) accompanying software and/or firmware.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatuses may also be implemented as one or more integrated circuits, such as application-specific integrated circuits ASIC (Application Specific Integrated Circuit). Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

What is claimed is:

1. An apparatus, wherein the apparatus comprises:
   a radio channel emulator of a radio system; and
   a combiner, the combiner being configured to receive antenna data defining a characteristic radiation pattern of each predetermined antenna element of a predetermined antenna array,
   the combiner being configured to form modified antenna data associated with a predetermined number of modified antenna elements by weighting the antenna data with a predetermined coefficient data,
   the combiner being configured to form modified radio channel data by combining a predetermined radio channel data and the modified antenna data,
   the combiner being configured to feed the modified radio channel data to a radio channel emulation,
   the emulator being configured to receive at least one signal each of which being associated with one of the modified antenna elements and perform emulation with the at least one signal and the modified radio channel data.

2. The apparatus of claim 1, wherein the apparatus comprises an antenna data memory configured to store the antenna data about the characteristic radiation pattern of each element of a real antenna array of a real base station of the radio system.

3. The apparatus of claim 1, wherein the apparatus comprises a coefficient data memory configured to store the predetermined coefficient data about couplings of the predetermined antenna elements.

4. The apparatus of claim 3, wherein the predetermined coefficient data is configured to define a relative power and a relative phase shift associated with each predetermined antenna element for providing a desired radiation pattern for the at least one modified antenna element.

5. The apparatus of claim 1, wherein the predetermined coefficient data is configured to define a relative power and a relative phase shift associated with each predetermined antenna element for providing a desired radiation pattern for the at least one modified antenna element.

6. The apparatus of claim 1, wherein the antenna data comprises geometrical data of the antenna array differing from the predetermined antenna array, the combiner being further configured to form the modified antenna data on the basis of the geometrical data.

7. The apparatus of claim 1, wherein the number of the predetermined antenna elements is smaller than a total number of the antenna elements of the predetermined antenna array.

8. The apparatus of claim 7, wherein coefficient data is configured to limit the number of the predetermined antenna elements to be smaller than the total number of the antenna elements of the predetermined antenna array.

9. The apparatus of claim 1, wherein the number of modified antenna elements defined by the modified antenna data is the same as or less than the number of the antenna elements of the predetermined antenna array.

10. A method, the method comprising:
receiving, by a combiner, antenna data defining a characteristic radiation pattern of each predetermined antenna element of a predetermined antenna array;
forming modified antenna data associated with a predetermined number of modified antenna elements by weighting the antenna data with a predetermined coefficient data;
forming modified radio channel data by combining a predetermined radio channel data and the modified antenna data;
feeding the modified radio channel data from the combiner to a radio channel emulation; and
receiving at least one signal each of which being associated with one of the modified antenna elements and performing emulation with the at least one signal and the modified radio channel data.

11. An apparatus comprising:
at least one processor; and
at least one memory including a computer program code, wherein the at least one memory and the computer program code are configured, with the at least one processor, to cause the apparatus at least to perform operations comprising:
receiving, by a combiner, antenna data defining a characteristic radiation pattern of each predetermined antenna element of a predetermined antenna array;
forming modified antenna data associated with a predetermined number of modified antenna elements by weighting the antenna data with a predetermined coefficient data;
forming modified radio channel data by combining a predetermined radio channel data and the modified antenna data;
feeding the modified radio channel data from the combiner to a radio channel emulation; and
receiving at least one signal each of which being associated with one of the modified antenna elements and performing emulation with the at least one signal and the modified radio channel data.

* * * * *